US005283867A

United States Patent [19]

Bayley et al.

[11] Patent Number: 5,283,867

[45] Date of Patent: Feb. 1, 1994

[54] DIGITAL IMAGE OVERLAY SYSTEM AND METHOD

[75] Inventors: Michael W. R. Bayley, San Jose; Peter C. Yanker, Portola Valley, both of Calif.

[73] Assignee: International Business Machines, Armonk, N.Y.

[21] Appl. No.: 898,377

[22] Filed: Jun. 9, 1992

Related U.S. Application Data

[63] Continuation of Ser. No. 366,962, Jun. 16, 1989, abandoned.

[51] Int. Cl.[5] .......... G06F 15/62

[52] U.S. Cl. .......... 395/164; 395/119; 395/133; 395/135; 395/162

[58] Field of Search .......... 395/119-123, 395/125, 126, 127, 128, 129-130, 133, 135-136, 155-158, 162, 164-166; 340/703, 721, 723, 725, 734, 747, 799, 801

[56] References Cited

U.S. PATENT DOCUMENTS 4,873,652 10/1989 Pilat et al. .......... 395/157
4,916,654 4/1990 Sherman et al. .......... 395/166

FOREIGN PATENT DOCUMENTS

0209749A2 1/1987 European Pat. Off. ....... G11C 8/00
0279230A2 8/1988 European Pat. Off. ...... G09G 1/16

OTHER PUBLICATIONS

An Architectural Solution for High Performance Graphic, Charles Carinalli, Nov. 19-22, 1985, pp. 1-9.
Research Disclosure No. 277, 1 May 1987, "Background Transparency Using a Transparent Color".
IBM Technical Disclosure Bulletin vol. 27, No. 7A 1 Dec. 1984, Y. Aoki et al., "Write Masking Method for Writing a Bit of Image Information into a Pixel TM ".

*Primary Examiner*—Gary V. Harkcom
*Assistant Examiner*—Almis Jankus
*Attorney, Agent, or Firm*—Perman & Green

[57] ABSTRACT

A data processing system includes, among others, three memory areas: a source memory which is addressed in planar, data unit increments and stores display data units on a bit per plane basis; a target memory for storing display data units in a manner suitable for operation of a display unit; and a window buffer for transferring display data units from the source memory to the target memory. The system includes apparatus for inhibiting certain data units from the source memory from overwriting data units already in the target memory. The method comprises first accessing a plurality of data units from the source memory and then logically determining if all bits of each accessed data unit meet a predetermined criteria. Each data unit found to meet the predetermined criteria is inhibited from altering any data unit already in the target memory.

7 Claims, 3 Drawing Sheets

| PELS. | PLANES 1 | 2 | 3 | 4 | OR REG 20 |
|---|---|---|---|---|---|
| E | 0 | 1 | 0 | 0 | 1 |
| F | 0 | 0 | 0 | 0 | 0 |
| G | 0 | 0 | 0 | 0 | 0 |
| H | 1 | 0 | 1 | 0 | 1 |
| I | 1 | 0 | 1 | 0 | 1 |
| J | 0 | 1 | 0 | 0 | 1 |
| K | 0 | 1 | 0 | 1 | 1 |
| L | 0 | 1 | 0 | 1 | 1 |

DIGITAL IMAGE OVERLAY SYSTEM AND METHOD

This is a continuation of copending application Ser. No. 07/366,962 filed on Jun. 16, 1989 now abandoned.

FIELD OF THE INVENTION

This invention relates to a method and apparatus for overlaying one digital image on another digital image and more particularly to a method for transferring and reformatting a block of image data from a bit-planar organized, source memory and overlaying it onto an image stored in a display target memory.

REFERENCE TO RELATED APPLICATION

This invention is related to inventions described in co-pending U.S. Patent application Ser. No. 07/242,327, filed, Sep. 6, 1988, now U.S. Pat. No. 4,916,654 for: "High Speed Method And Apparatus For Data Transfer"; and U.S. Patent application, Ser. No. 07/242,326, now U.S. Pat. No. 4,956,810 for: "High Speed Method For Data Transfer", both assigned to the same Assignee as this application.

BACKGROUND OF THE INVENTION

Currently, there are program products available for personal computers which allow the user to produce an audiovisual presentation or to add images and audio to other applications for presentation purposes. Such program products enable the display of real images with high quality sound, text, graphics, animation and other special effects. In utilizing the personal computer to assemble such presentation packages, the user must often provide for picture-to-picture transition (e.g. dissolves), for overlays of one image upon another (e.g. animation) and for other applications wherein portions of one image are transparent in relation to an underlying image, both images being superimposed during preparation of the presentation.

As is known, to enable the creation of such presentations requires the movement of various "screens" of data from one place to another within the PC. A screen of data is an image in memory that is viewable by the user on the display. In essence the screen is comprised of a block of data which, when inserted into the display, enables it to show the image on a CRT or other presentation device.

PC memories are often not designed to interface readily with sophisticated graphic display units For instance, many PC random access memories (RAMs) are organized on a bit-planar basis with each respective bit of a byte or word resident in a plurality of planes in correspondingly aligned bit positions. Such PC/RAM organization are useful for data processing applications where predetermined blocks of data are accessed and handled. However, when it is necessary to access a block of data, where the block may have any starting point and any end point, and to transfer such block of data into a display memory at a starting point chosen by the user, such an operation can be accomplished but generally slowly.

Block data transfers are encountered in display applications where it is desirable to insert in a display memory, a new screen of data in place of or superimposed over a pre-existing screen. In the case of such data transfers, the system must access a data unit corresponding to a first picture element (Pel) and then continue accessing data units until the last Pel is retrieved. The accessed data units must be aligned so that they are properly justified when inserted into the display memory. This allows optimum use of the display memory's capacity In certain cases, it is desirable that portions of the inserted screen be "transparent", so that corresponding portions of the preexisting screen are not obscured when the new screen is written over the preexisting screen.

Many PC/RAMs are accessible on only a byte or larger data unit basis, so if the initial Pel starts in the interior of a byte, the Pel must be extracted from the byte, aligned and then transferred. All of this is preferably done with a minimum number of memory accesses to avoid the delays inherent therein.

In the referenced co-pending applications, methods are disclosed therein for enabling extremely rapid transfers of blocks of data through a window buffer that forms the main gateway to and from a display memory. There is no provision in the aforementioned methods for coping with the question of image transparency.

In U.S. Pat. No. 4,616,336 to Robertson et al, assigned to the same assignee as this application, the matter of image overlays is addressed Robertson et al disclose a word processing system wherein alphanumeric data can be overlaid on a graphics image. The system merges the alphanumeric's over the graphics and elects to display the non-blank image at each screen area, with conflicts being resolved in favor of the alphanumerics. Robertson et al do not contemplate or teach how to accomplish an image overlay, as the foreground image is being transferred to the background image memory and is in the process of being reformatted to match the background image memory.

Accordingly, it is an object of this invention to provide a method and means for block data transfers wherein one block is written over another only in selected areas.

It is another object of this invention to provide a rapid method and means for screen data transfer wherein one screen has transparent portions and is written over a background screen.

Still another object of this invention is to provide a rapid method and means for display data transfers between memories through a window buffer wherein the transfer accomplishes alignment and transparency tests in a rapid fashion.

SUMMARY OF THE INVENTION

A data processing system is described which includes, among others, three memory areas: a source memory which is addressed in planar, data unit increments and stores display data units on a bit-per plane basis; a target memory for storing display data units in a manner suitable for operation of a display unit; and a window buffer for transferring display data units from the source memory to the target memory. The system includes apparatus for inhibiting certain data units from the source memory from overwriting data units already in the target memory. The method of the invention comprises first accessing a plurality of data units from the source memory and then logically determining if all bits of each accessed data unit meet a predetermined criteria. Each data unit found to meet the predetermined criteria is inhibited from altering any data unit already in the target memory.

DETAILED DESCRIPTION OF THE INVENTION

Figures 1, 5:
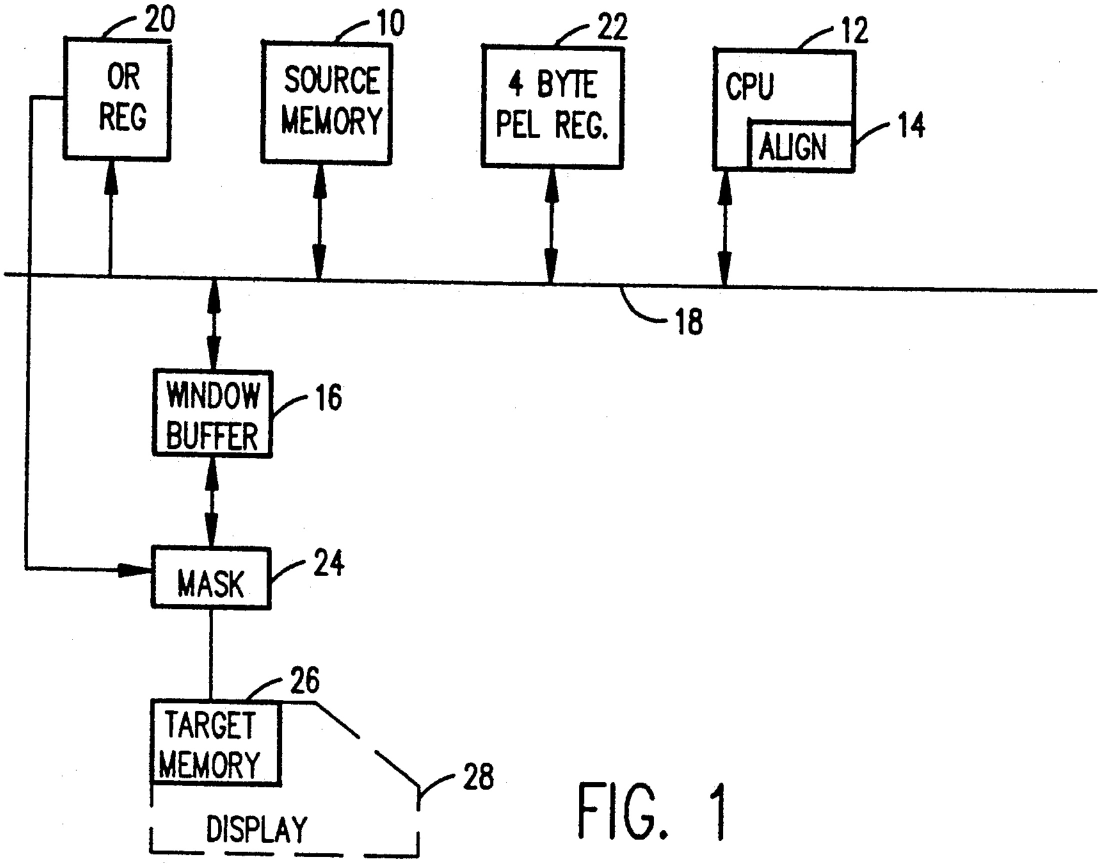
FIG. 1 is a block diagram of a system incorporating the invention.
FIG. 5 illustrates the bit-makeup of a plurality of Pels to be transferred from the source memory to the target memory.

Referring to FIG. 1, a block diagram is shown of a portion of the circuitry contained in a personal computer, such as the IBM PS/2. At one level of operation, the invention moves image data from one memory to another at very high data rates, notwithstanding the fact that the image data in the one memory is stored in one block format and must be stored in a display on "target" memory in a different block of boundary format. Furthermore, the invention provides the capability for inhibiting the writing of any unit of image data which indicates transparency, so that data already in the display memory is not affected at corresponding display data unit positions.

Source memory 10 is a RAM that is bit-planar organized and has its input-output functions controlled from central processing unit (CPU) 12. CPU 12 contains an alignment register 14 which is utilized when data is accessed from source memory 10 and before it is inserted into a window buffer 16. While contained within CPU 12, two separate registers are shown, for illustrative purposes as directly connected to a bus 18. Those registers are Or register 20 and four-byte, Pel register 22. Each position in Or register 20 is connected to a mask register 24 which is in turn connected between window buffer 16 and target memory 26. Target memory 26 forms a portion of a display 28 which is shown in phantom in FIG. 1.

The operation of the system of FIG. 1 commences with CPU 12 calling for transfer of a screen of data from source memory 10 to target memory 26. As aforestated, source memory 10 is bit-planar and the block of data called for may or may not coincide with byte and/or word boundaries within memory 10. The accessed data from memory 10 must thus, first be aligned so that it can be inserted into window buffer 16 as that buffer forms the transfer path for screen data between source memory 10 and target memory 26. That alignment occurs in alignment register 14 and occurs as described in copending U.S. Patent application, Ser. No. 07/242,327, the contents of which are incorporated herein by reference. In brief, each segment of data accessed from source memory 10 is rotated to right-justify the data to a boundary. Then, each bit in each Pel data segment is Or'd so as to determine whether the Pel is transparent or non-transparent. The results of each Or operation are retained in Or register 20 and the Pel bytes are stored in Pel register 22. At the conclusion of the Or'ing operation, Or register 20 sets mask 24 to prevent transfer of any Pel which is transparent (e.g. all zeros). Then, the Pel information is transferred from register 22 through window buffer 16 and mask 24 to target memory 26. Pels which have not been masked overwrite corresponding Pels in target memory 26, whereas Pels which have been masked leave the Pels in corresponding areas of target memory 26 unaffected.

Figure 2:
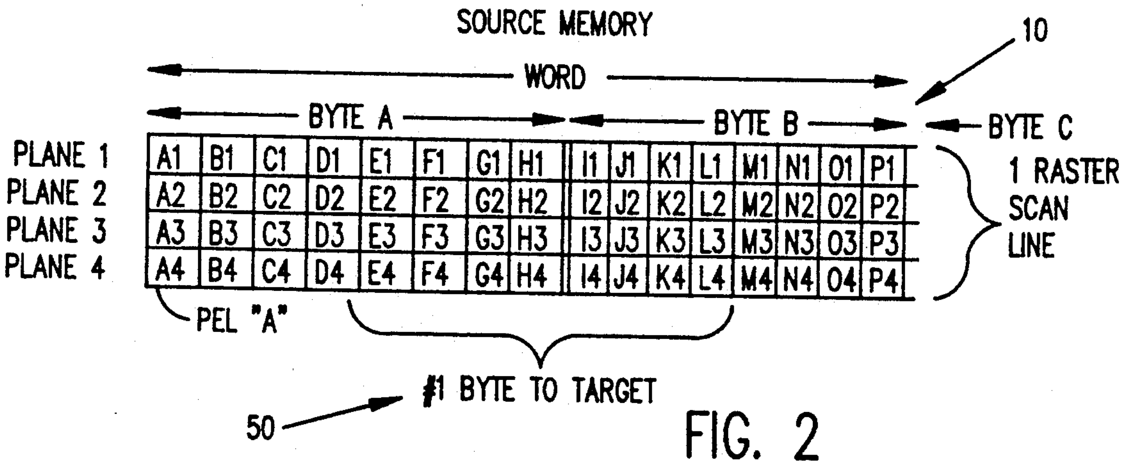
FIG. 2 outlines the structure of a source memory employed in the system of FIG. 1.
Figure 3:
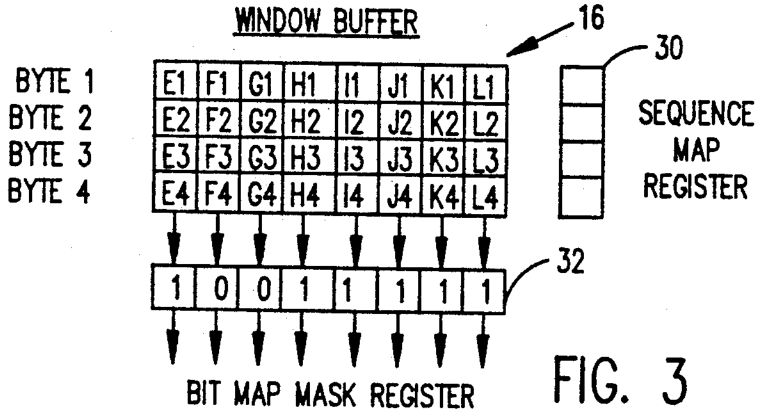
FIG. 3 outlines the structure of a window buffer employed in the system of FIG. 1.
Figure 4:
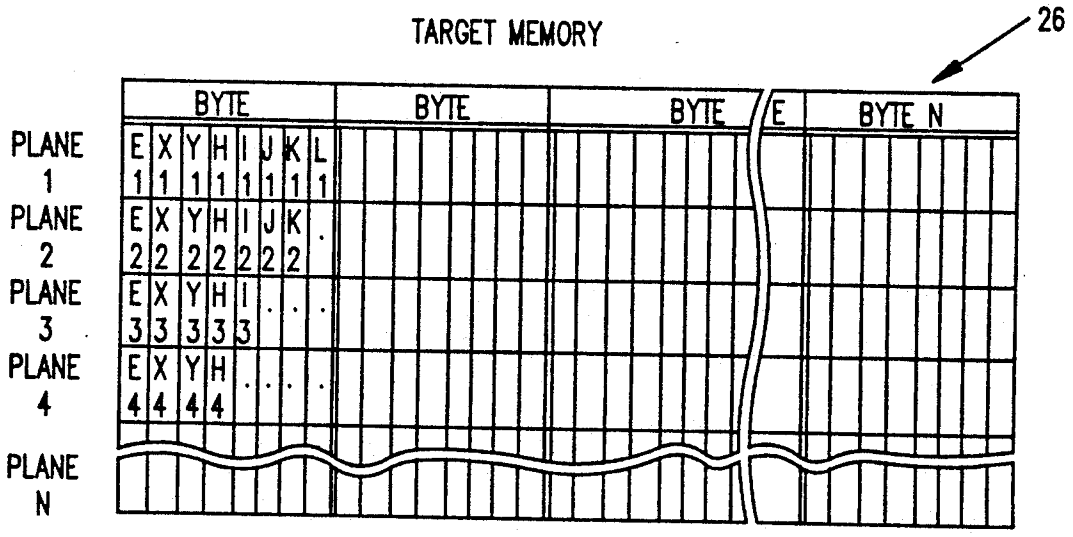
FIG. 4 outlines the structure of a target memory employed in the system of FIG. 1.

Turning now to FIG. 2-4, the structures of source memory 10, window buffer 16 and target memory 26 will be described.

As shown in FIG. 2, source memory 10 comprises a plurality of planes. Each plane is organized on a byte basis and includes N bytes with the first byte being designated "byte A". Each byte is eight bits long, and while only two bytes, e.g., byte A and byte B are shown, it is to be understood that source memory 10 will generally contain a sufficient number of bytes to comprise an entire raster scan line (e.g. 640 Pels). In source memory 10, a Pel is organized on a bit-per-plane basis and includes, for example, four bits. For instance, bits A1, A2, A3 and A4 comprise the "A" Pel, with succeeding lettered Pels being similarly organized. One raster scan of a display comprises the output of memory planes 1-4 of source memory 10.

As indicated above, it often occurs that a block of Pel data to be accessed from source memory 10 and transferred to target memory 26 does not coincide in boundaries with the byte boundaries of source memory 10. For instance, as shown in FIG. 2, it is assumed that the first byte to be transferred to target memory 26 starts with Pel E and ends with Pel L. Most PC organizations are only capable of accessing planar data on a byte or word basis, so in order to access the first byte of Pels to be transferred to the target memory, an entire word must be accessed from source memory 10 and the desired Pel bytes extracted therefrom.

In FIG. 3, the structure of window buffer 16 is schematically illustrated and includes four bytes of Pel data, oriented on a bit-per-plane basis. In essence, window buffer 16 is adapted to hold four bytes of Pel data from source memory 10 in the manner shown. Window buffer 16 is further provided with a sequence map register 30 which controls the sequence of write-out of its planes 1-4. A bit map mask register 32, as will be hereinafter understood, controls which of the Pels may be read-out from window buffer 16.

Target memory 26 is shown in FIG. 4 and is organized much the same as source memory 10 in that it is bit-planar. However, it's memory positions have no particular pre-existing alignment with those of source memory 10. The data units within target memory 26 are employed to drive a display device 28 and are replaced if the data being displayed is to be changed. Such requirement to change data may occur anywhere in target memory 26 and the initial Pel for such a change of data may occur in any planar byte.

In the normal operation of a PC-driven graphic display system, the user selects an area of data to be displayed and instructs the system to perform the selection and display function. Inputs from an appropriate device (e.g., light pen, mouse, etc.), enables CPU 12 to commence certain initialization steps. Those steps include the defining of a starting Pel number, determining that Pel's address within source memory 10, defining a starting address where the first Pel will be placed in target memory 26, and further defining the total number of Pels to be transferred from source memory 10 to target memory 26. Subsequent to these initialization steps, the first word is accessed from source memory 10. It will be assumed that (see FIG. 2) the first block of memory to be transferred will be as indicated at 50 in FIG. 2. Note that Pel's E-L are to be extracted from bytes A and B in source memory 10 and placed in window buffer 16 (FIG. 3). The second group of bytes to be accessed would start with Pel M and then proceed for another seven Pels into byte C, etc. As aforestated, window buffer 16 provides the sole route of access between source memory 10 and target memory 26.

Figure 6:
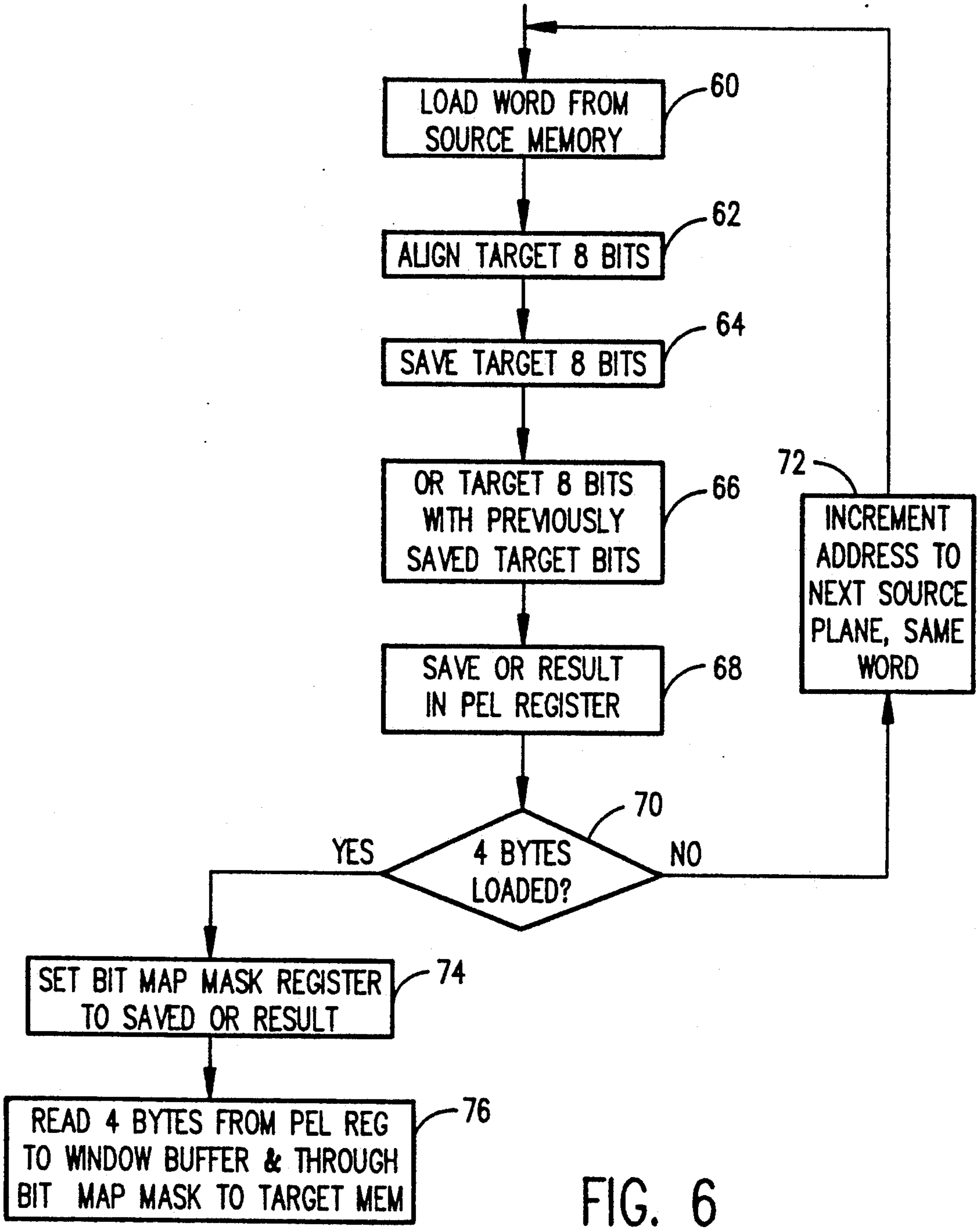
FIG. 6 is a high-level flow diagram illustrating the operation of the invention.

As shown in FIG. 6, the procedure commences with a load command as shown in box 60. Then, the initial eight bit byte to be transferred to target memory 26 is aligned (box 62). This is accomplished by source memory 10 transferring from plane 1, bytes A and B into alignment register 14 within CPU 12. Register 14 operates as described in copending U.S. Patent application, Ser. No. 07/242,327, and acts to right-justify bit stream E1–L1 to the right-most boundary of the register, through a "word rotate" operation. When bits E1–L1 are aligned, they are stored (box 64) in Pel register 22. Simultaneously, the initial eight bit byte of Pel bits (E1–L1) are Or'd within CPU 12 with previous bits from corresponding Pels. When bits E1–L1 are accessed, there are no previously accessed bits so the results of the Or operation are identical with the logical states of bits E1–L1. The results of that Or operation are stored in Or register 20 (box 68). It is then determined whether four bytes have been loaded into Pel register 22 (box If the answer is no, the address is incremented to the next plane and the same two words are accessed (bytes A and B) and an identical operation is repeated (i.e., rotate to align, transfer byte and Or).

As shown in FIG. 5, assume that each of Pels E–L has the bit arrangements shown. Thus, at the end of the first Or operation, Or register 20 will have ones stored in bit positions corresponding to the H and I Pels and zero's everywhere else. To the right of the chart is a column indicating the data state of Or register 20 after all four bytes have been run through the Or operation. Note that Or register 20 will have one's in every Pel position save Pel positions corresponding to Pels F and G. Those Pels are transparent and are to be suppressed when the Pel byte is being written into target memory 26.

Turning now back to FIG. 6, once the initial four bytes have been loaded into Pel register 22, the bit positions of each have been successively Or'd, and the Or results stored in Or register 20, bit map mask register 32 associated with window buffer 16 (FIG. 3) is set in accordance with the logic states of each bit position of Or register 20 (box 74). The accumulated Pels in Pel register 22 are read into window buffer 16, through mask 24 and into target memory 26. As these bits are flushed through the aforementioned path, bit map mask register 32 inhibits any write action within target memory 26 at Pel positions F and G. Thus, assuming Pels E–L are written into the first byte of target memory 26, Pel E is written into the first bit positions of planes 1–4 whereas previously existing Pels X and Y remain in the second and third bit positions. The subsequent bit position have inserted therein Pels H–L, etc. (box 76, FIG. 6). It can thus be seen that an image from source memory 10 can be overwritten with an image in target memory 26 while enabling certain portions of the image already existing in target memory 26 to remain unaffected.

It should be understood that the foregoing descriptions only illustrative of the invention. There is alternatives and modifications can be devised by those skilled in the art without departing from the invention. Accordingly, the present invention is intended to embrace all such alternatives, modifications and variances which fall within the scope of the appended claims.

What is claimed is:

1. In a data system including a bit planar oriented data unit source memory for data to be displayed; a target display memory having a plurality of planes, each plane comprising serially arranged multi-bit data units; buffer means for transferring data from said source memory to said target display memory; and transfer inhibit means for preventing transparent data units from overwriting data units already in said target memory, a transparent data unit having all bit positions equal to zero, the data processing system performing the method comprising:

(a) accessing and aligning a plurality of data units from said source memory;

(b) determining logically if all bits of each accessed data unit indicate that said data unit is transparent;

(c) passing a plurality of aligned data units in parallel through said buffer means;

(d) inhibiting output of any data unit from said buffer means that is found to be transparent by said logical determination step (b), whereby alteration of any data unit in said target display memory by any transparent data unit from said buffer means is prevented.

2. The method as defined in claim 1 wherein said source memory data unit is a Pel and comprises a plurality of bits, one bit per plane and said target display memory is a Pel oriented memory for controlling a display.

3. The method as defined in claim 2 wherein said determining step comprises:

(e) Or'ing all data bits of each Pel together to determine if each said Pel exhibits an OR value that is non-zero or zero.

4. The method as defined in claim 3 wherein said transfer inhibit means is a bit mask having a position corresponding to each of a plurality of Pels, the inhibiting step further comprising:

(f) inserting in each corresponding mask position, an "inhibit write" indication for each Pel whose Or condition, as determined in step (e), is zero; and (g) passing the bits of each Pel from said buffer means under control of the corresponding mask position, whereby bits from any zero Pel do not overwrite corresponding bit positions in said target memory.

5. The method as defined in claim 4 wherein said source memory comprises a plurality of planes, each plane including one bit of a multi-bit Pel code, each plane addressable on a two byte basis, the method further comprising, after said accessing step (a):

(h) aligning a plural Pel segment of said two bytes to a preset boundary (i) inserting said aligned, plural Pel segments into a window buffer, one side of said window buffer coincident with said preset boundary

6. The method as defined in claim 5 wherein said bit mask:

(j) inhibits the transfer of any Pel bits from said window buffer when the OR value of said Pel equals zero

7. In a data processing system for transferring Pel bits of display data from a bit-planar, byte organized source memory through an N byte window buffer, to a display memory, the combination comprising:

(a) register means for aligning N multi-bit Pel values from said source memory;

(b) bit mask means having a position corresponding to each multi-bit Pel value in said window buffer;

(c) logic means for ORing all bits in each multi-bit Pel value to determined non-zero multi-bit Pel values, and setting said bit mask means to pass such non-zero multi-bit Pel values; and (d) means controlled by said bit-mask means for writing only said non-zero multi-bit Pel values from said window buffer into said display memory, whereby zero-value multi-bit Pel values are prevented from altering multi-bit Pel values stored in said display memory.

* * * * *

UNITED STATES PATENT AND TRADEMARK OFFICE

CERTIFICATE OF CORRECTION

PATENT NO. : 5,283,867

DATED : February 1, 1994

INVENTOR(S) : Bayley et al.

It is certified that error appears in the above-identified patent and that said Letters Patent is hereby corrected as shown below:

In claim 1, col. 6, line 7, after the word "data" (first occurrence) should appear the word --processing--.

Signed and Sealed this

Thirty-first Day of May, 1994

Attest:

BRUCE LEHMAN

*Attesting Officer*

*Commissioner of Patents and Trademarks*